United States Patent
Kim et al.

(10) Patent No.: US 10,983,722 B2
(45) Date of Patent: Apr. 20, 2021

(54) DATA STORAGE DEVICE USING HOST MEMORY BUFFER AND METHOD OF OPERATING THE SAME

(71) Applicant: SAMSUNG ELECTRONICS CO., LTD., Suwon-si (KR)

(72) Inventors: Hyun-Seok Kim, Seoul (KR); Walter Jun, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/506,613

(22) Filed: Jul. 9, 2019

(65) Prior Publication Data

US 2020/0133566 A1  Apr. 30, 2020

(30) Foreign Application Priority Data

Oct. 24, 2018 (KR) .................. 10-2018-0127154

(51) Int. Cl.
| | |
|---|---|
| *G06F 12/00* | (2006.01) |
| *G06F 3/06* | (2006.01) |
| *G06F 1/3206* | (2019.01) |
| *H04L 9/08* | (2006.01) |
| *H04L 9/32* | (2006.01) |
| *G06F 9/30* | (2018.01) |

(52) U.S. Cl.
CPC .......... *G06F 3/0656* (2013.01); *G06F 1/3206* (2013.01); *G06F 3/0607* (2013.01); *G06F 3/0622* (2013.01); *G06F 3/0658* (2013.01); *G06F 3/0679* (2013.01); *G06F 9/30098* (2013.01); *H04L 9/0869* (2013.01); *H04L 9/3247* (2013.01)

(58) Field of Classification Search
CPC .... G06F 3/0656; G06F 3/0607; G06F 3/0622; G06F 3/0658; G06F 3/0679; G06F 1/3206; G06F 9/30098; H04L 9/0869; H04L 9/3247
See application file for complete search history.

(56) References Cited

U.S. PATENT DOCUMENTS

| | | | |
|---|---|---|---|
| 8,423,754 B2 * | 4/2013 | Lee ..................... | G06F 9/4401 713/2 |
| 8,954,654 B2 | 2/2015 | Yu et al. | |
| (Continued) | | | |

*Primary Examiner* — Shawn X Gu
(74) *Attorney, Agent, or Firm* — Volentine, Whitt & Francos, PLLC

(57) ABSTRACT

A data storage device includes a nonvolatile memory device, a storage controller and a mapping controller. The nonvolatile memory device stores an execution code that controls operations of the data storage device. The storage controller uploads and stores the execution code from the nonvolatile memory device to a host memory buffer included in an external host device, and downloads the execution code in realtime from the host memory buffer to execute the execution code that is downloaded from the host memory buffer. The mapping controller manages a mapping table including mapping relations between the execution code and host addresses of the host memory buffer at which the execution code is stored. A speed of accessing the execution code is increased and performance of the data storage device is enhanced by using the host memory buffer as storage of the execution code to control the operation of the data storage device.

20 Claims, 21 Drawing Sheets

(56) References Cited

U.S. PATENT DOCUMENTS

| | | |
|---|---|---|
| 9,575,884 B2 | 2/2017 | Chun et al. |
| 10,002,155 B1 | 6/2018 | Caudy et al. |
| 10,007,433 B2 | 6/2018 | Hahn |
| 2016/0246726 A1 | 8/2016 | Hahn |
| 2017/0242606 A1 | 8/2017 | Vlaiko et al. |
| 2017/0285940 A1 | 10/2017 | Benisty et al. |
| 2017/0285968 A1* | 10/2017 | Jung .................. G06F 3/0604 |
| 2017/0300246 A1 | 10/2017 | Michaeli |

* cited by examiner

FIG. 5A

MPT(S1)

| EXCD | IMAD | HMBAD |
|---|---|---|
| CDSEC1 | × | HMBADa |
| CDSEC2 | × | HMBADb |
| CDSEC3 | IMADq | HMBADc |
| CDSEC4 | × | HMBADd |
| CDSEC5 | × | HMBADe |
| CDSEC6 | IMADp | HMBADf |
| CDSEC7 | × | HMBADg |
| CDSEC8 | × | HMBADh |

FIG. 8A

MPT(S2)

| EXCD | IMAD | HMBAD | PRIORITY |
|---|---|---|---|
| CDSEC1 | × | HMBADd | 3 |
| CDSEC2 | × | × | 5 |
| CDSEC3 | IMADq | HMBADb | 1 |
| CDSEC4 | × | × | 8 |
| CDSEC5 | × | HMBADa | 4 |
| CDSEC6 | IMADp | HMBADc | 2 |
| CDSEC7 | × | × | 7 |
| CDSEC8 | × | × | 6 |

FIG. 8B

MPT(S3)

| EXCD | IMAD | HMBAD | PRIORITY |
|---|---|---|---|
| CDSEC1 | × | HMBADd | 4 |
| CDSEC2 | × | × | 6 |
| CDSEC3 | IMADq | HMBADb | 2 |
| CDSEC4 | × | × | 8 |
| CDSEC5 | × | × | 5 |
| CDSEC6 | × | HMBADc | 3 |
| CDSEC7 | × | × | 7 |
| CDSEC8 | IMADp | HMBADa | 1 |

FIG. 9A

MPT(S4)

| EXCD | IMAD | HMBAD | PRIORITY |
|---|---|---|---|
| CDSEC1 | × | HMBADd | 3 |
| CDSEC2 | × | × | × |
| CDSEC3 | × | HMBADb | 1 |
| CDSEC4 | × | × | × |
| CDSEC5 | × | HMBADa | 4 |
| CDSEC6 | IMADp | × | × |
| CDSEC7 | × | × | × |
| CDSEC8 | × | HMBADc | 2 |

FIG. 9B

MPT(S5)

| EXCD | IMAD | HMBAD | PRIORITY |
|---|---|---|---|
| CDSEC1 | × | HMBADd | 4 |
| CDSEC2 | × | × | × |
| CDSEC3 | × | HMBADb | 2 |
| CDSEC4 | × | × | × |
| CDSEC5 | × | × | × |
| CDSEC6 | IMADp | × | × |
| CDSEC7 | × | HMBADa | 1 |
| CDSEC8 | × | HMBADc | 3 |

DATA STORAGE DEVICE USING HOST MEMORY BUFFER AND METHOD OF OPERATING THE SAME

CROSS-REFERENCE TO RELATED APPLICATION

A claim for priority under 35 USC § 119 is made to Korean Patent Application No. 10-2018-0127154, filed on Oct. 24, 2018, in the Korean Intellectual Property Office (KIPO), the entire contents of which are hereby incorporated by reference.

BACKGROUND

The present inventive concepts herein relate to semiconductor integrated circuits, and more particularly to data storage devices using a host memory buffer and methods of operating data storage devices.

Semiconductor memory devices for storing data may be classified into volatile memory devices such as dynamic random access memory (DRAM) for example that may be used as main memory to run software, and nonvolatile memory devices such as NAND flash memory for example that may be used to store user data. Volatile memory provides comparably fast read and write speeds and enables byte-access, but has disadvantages of nonvolatility and high cost. Although the cost of data storage devices may be reduced by decreasing capacity of random accessible memory included therein, performance of such data storage devices having decreased random accessible memory capacity is however degraded.

SUMMARY

Embodiments of the inventive concepts provide a data storage device and a method of operating a data storage device, capable of efficiently using a memory space.

Embodiments of the inventive concepts provide a data storage device including a nonvolatile memory device, a storage controller and a mapping controller. The nonvolatile memory device stores an execution code that controls operations of the data storage device. The storage controller uploads and store the execution code from the nonvolatile memory device to a host memory buffer included in an external host device, and downloads the execution code in realtime from the host memory buffer and executes the execution code downloaded from the host memory buffer. The mapping controller manages a mapping table including mapping relations between the execution code and host addresses of the host memory buffer at which the execution code is stored.

Embodiments of the inventive concepts further provide a data storage device including a nonvolatile memory device configured to store an execution code that control operations of the data storage device; a security engine configured to encode the execution code to generate a secured execution code; a storage controller configured to upload and store the secured execution code to a host memory buffer included in an external host device, and to download the secured execution code in realtime from the host memory buffer to provide the downloaded secured execution code to the security engine; and a mapping controller configured to manage a mapping table including mapping relations between the execution code and host addresses of the host memory buffer at which the secured execution code is stored. The security engine is further configured to decode the downloaded secured execution code to provide the execution code. The storage controller is further configured to execute the execution code provided from the security engine.

Embodiments of the inventive concepts still further provide a method of operating a data storage device, which includes uploading and storing, by a storage controller included in the data storage device, an execution code that controls operations of the data storage device from a nonvolatile memory device included in the data storage device to a host memory buffer included in a host device; downloading, by the storage controller, the execution code in realtime from the host memory buffer and executing the execution code downloaded from the host memory buffer; and managing, by a mapping controller included in the data storage device, a mapping table including mapping relations between the execution code and host addresses of the host memory buffer at which the execution code is stored.

The data storage device and the method of operating the data storage device according to embodiments of the inventive concepts may increase a speed of accessing the execution code and enhance performance of the data storage device even though the internal random accessible memory inside the data storage device may be deficient, by using the host memory buffer as a storage of the execution code that controls the operation of the data storage device.

In addition, the data storage device and the method of operating the data storage device according to embodiments of the inventive concepts may enhance security of the data storage device and a system including the data storage device by encoding the execution code and uploading the secured execution code to the host memory buffer.

BRIEF DESCRIPTION OF THE DRAWINGS

Example embodiments of the inventive concepts will be more clearly understood from the following detailed description taken in conjunction with the accompanying drawings.

FIG. 5A illustrates a diagram of a mapping table included in a data storage device according to embodiments of the inventive concepts.

FIG. 8A illustrates a diagram of a memory storage state of a system including a data storage device according to embodiments of the inventive concepts.

FIG. 8B illustrates a diagram of the memory storage state of the system as described with respect to FIG. 8A, after an updating operation is performed.

FIG. 9A illustrates a diagram of a memory storage state of a system including a data storage device according to other embodiments of the inventive concepts.

FIG. 9B illustrates a diagram of the memory storage state of the system as described with respect to FIG. 9A, after an updating operation is performed.

DETAILED DESCRIPTION OF THE EMBODIMENTS

Figure 1:
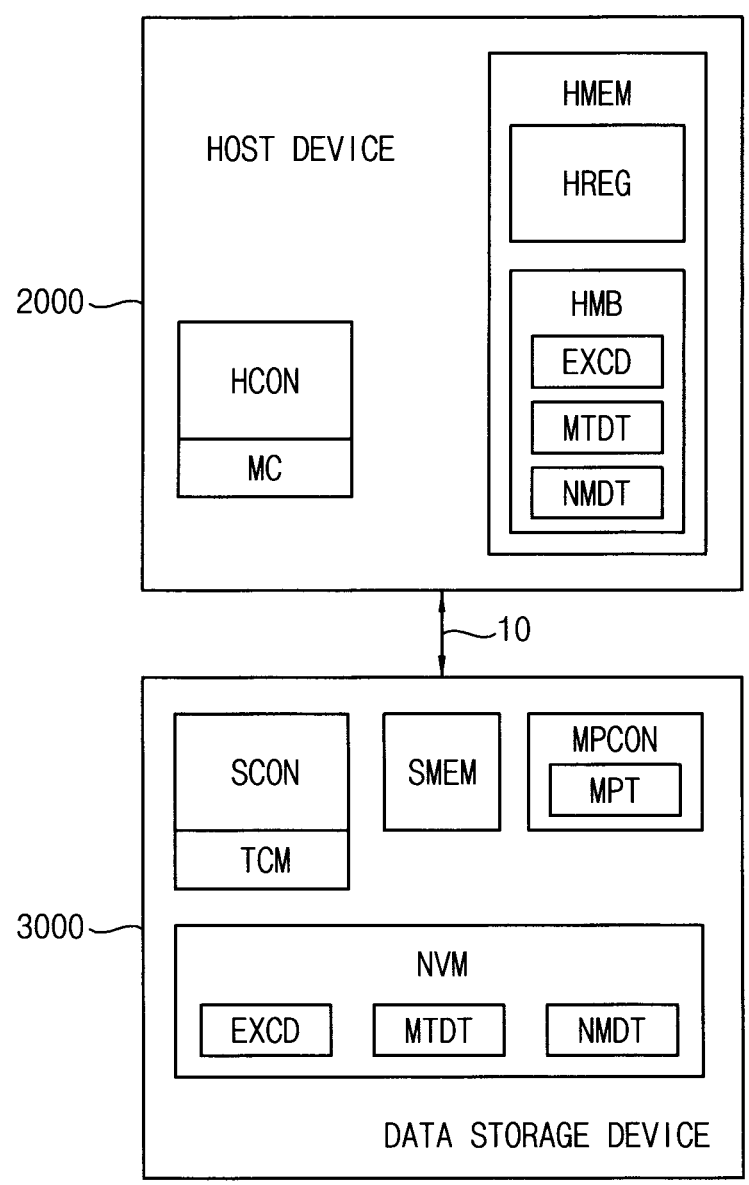
FIG. 1 illustrates a block diagram of a system including a data storage device according to embodiments of the inventive concepts.

Various example embodiments will be described more fully hereinafter with reference to the accompanying drawings. In the drawings, like numerals refer to like elements throughout. Repetitive description may be omitted.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 2:
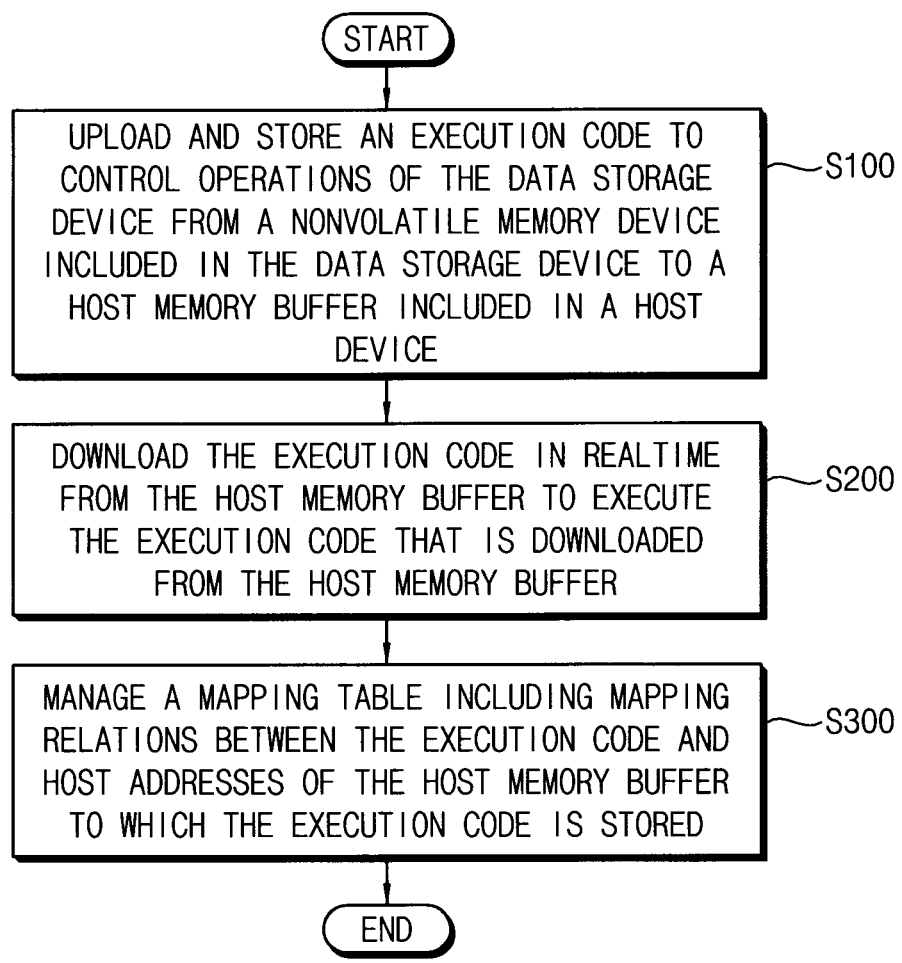
FIG. 2 illustrates a flow chart of a method of operation of a data storage device according to embodiments of the inventive concepts.

FIG. 1 illustrates a block diagram of a system including a data storage device according to embodiments of the inventive concepts. FIG. 2 illustrates a flow chart of a method of operation of a data storage device according to embodiments of the inventive concepts.

Referring to FIG. 1, system 1000 includes host device 2000 and data storage device 3000.

The host device 2000 includes a host controller HCON and a host memory HMEM. The host controller HCON may control overall operations of the host device 2000. The host controller HCON may be a hardware-based data processing device that includes a circuit physically configured to execute operations expressed by commands included in code or a program. For example, the host controller HCON may be a system-on-chip (SoC), a general purpose processor, a specific-purpose processor, an application processor or the like.

The host memory HMEM may be implemented as a random access memory configured to communicate with the host controller HCON and function as a main memory, a buffer memory or a cache memory of the host device 2000. The host controller HCON may store code or data at the host memory HMEM temporarily. The host controller HCON may execute a variety of software, such as an operating system and an application, by using the host memory HMEM. The host memory HMEM may include volatile memory such as for example static RAM (SRAM), dynamic RAM (DRAM), or synchronous DRAM (SDRAM), or non-volatile memory such as for example phase-change RAM (PRAM), magnetic RAM (MRAM), resistive RAM (RRAM), or ferroelectric RAM (FRAM).

When the host device 2000 and the data storage device 3000 are configured such that data of the data storage device 3000 may be loaded to the host memory HMEM, the host controller HCON may assign a portion of a memory space of the host memory HMEM to be used by the data storage device 3000. In this case, the host region HREG of the host memory HMEM may be used by the host device 2000 and the host memory buffer HMB may be assigned to be used by the data storage device 3000.

The host controller HCON may include a memory controller MC configured to control the host memory HMEM, and the host controller HCON may use the host region HREG of the host memory HMEM through the memory controller MC. According to example embodiments, the memory controller MC may be a component distinct from the host controller HCON. When the host memory buffer HMB is provided for the data storage device 3000, the data storage device 3000 may use the host memory buffer HMB without intervention of the host controller HCON or the memory controller MC.

The data storage device 3000 includes a storage controller SCON, a storage memory SMEM, a mapping controller MPCON and a nonvolatile memory device NVM. According to example embodiments, the data storage device 3000 may further include a tightly-coupled memory TCM that is dedicated to the storage controller SCON. The tightly-coupled memory TCM may be disposed inside or outside the storage controller SCON.

The nonvolatile memory device NVM may store various data used by the host device 2000 and the data storage device 3000. For example, as illustrated in FIG. 1, the nonvolatile memory device NVM may store an execution code EXCD, meta data MTDT and other normal data NMDT.

The execution code EXCD is a program code for controlling operations of the data storage device 3000, and corresponds to an operation code such as an operating system (OS) that is run by the storage controller SCON. After compiling is completed, the execution code EXCD is stored and maintained in the nonvolatile memory device NVM. The execution code EXCD may be read from the nonvolatile memory device NVM and changing of the execution code EXCD is limited.

The meta data MTDT may include information on methods or regulations to control the nonvolatile memory device NVM. For example the meta data MTDT may include data representing mapping relations between logical addresses that the host device 2000 assigns to the nonvolatile memory device NVM and physical addresses of the nonvolatile memory device NVM. The storage controller SCON may convert the logical addresses imposed by the host device 2000 to the physical addresses by referring to the meta data MTDT and, based on the physical address, the storage controller SCON may perform a write operation, a read operation, an erase operation and a background operation with respect to the nonvolatile memory device NVM.

The normal data NMDT may include various applications and data that are written and read freely by the host device 2000.

The nonvolatile memory device NVM may include a plurality of NAND flash memories. According to example embodiments, the nonvolatile memory device NVM may include for example NOR flash memory, ferroelectric random access memory (FRAM), phase change random access memory (PRAM), thyristor random access memory (TRAM), magnetic random access memory (MRAM), or the like.

The storage controller SCON may control overall operations of the data storage device 3000. The storage controller SCON may perform data communication with the host device 2000. An interface between the storage controller SCON and the host device 2000 may be configured to implement one or more data communication protocols or specifications. For example, the interface may support communication using at least one the conventionally understood standards associated with Universal Serial Bus (USB), Advanced Technology Attachment (ATA), serial ATA (SATA), Small Computer Small Interface (SCSI), serial attached SCSI (SAS), parallel ATA (PATA), High Speed Inter-Chip (HSIC), Firewire, Peripheral Component Interconnection (PCI), PCI express (PCIe), Nonvolatile Memory Express (NVMe), Universal Flash Storage (UFS), Secure Digital (SD), Multi-Media Card (MMC), embedded MMC (eMMC), or the like.

The host controller HCON may load source codes stored in the nonvolatile memory device NVM to the host region HREG of the host memory HMEM and may drive various software such as an OS and applications by executing the source codes in the host region HREG. Also the host controller HCON may load data stored in the nonvolatile memory device NVM to the host region HREG and process the loaded data. In addition, the host controller HCON may store the data to be maintained in the nonvolatile memory device NVM.

In general, the storage controller SCON loads the execution code EXCD from the nonvolatile memory device NVM to the internal memory such as the storage memory SMEM and the tightly-coupled memory TCM, and controls the overall operations of the data storage device 3000 by running the loaded execution code EXCD. However, the internal memory is expensive because it is required to be accessed randomly and at high speed. Accordingly, the internal memory of the data storage device 3000 typically may be excluded or have deficient memory capacity in many cases.

When the internal memory of the data storage device 3000 is deficient, the storage controller SCON has to instead control operation by reading the execution code EXCD from the nonvolatile memory device NVM rather than the internal memory (i.e., the storage memory SMEM or the tightly-coupled memory TCM). However, the nonvolatile memory device NVM operates at relatively low speed, and operational characteristics of the nonvolatile memory device NVM degenerate as accesses thereto are repeated. Thus, performance of the data storage device 3000 is degraded when the storage controller SCON operates based on the execution code EXCD stored in the nonvolatile memory device NVM.

Referring to FIGS. 1 and 2, in embodiments of the inventive concepts the storage controller SCON may upload and store the execution code EXCD that is used to control operations of the data storage device 3000 from the nonvolatile memory device NVM included in the data storage device 3000 to the host memory buffer HMB included in the host device 2000 (S100). The storage controller SCON may download the execution code EXCD in realtime from the host memory buffer HMB to execute the execution code EXCD that is downloaded from the host memory buffer HMB (S200). According to example embodiments, the meta data MTDT and/or the normal data NMDT may also be uploaded to the host memory buffer HMB. The mapping controller MPCON may manage a mapping table MPT including mapping relations between the execution code EXCD and host addresses of the host memory buffer HMB to which the execution code EXCD is stored (S300).

As such, by using the host memory buffer HMB as a storage of the execution code EXCD that controls the operation of the data storage device 3000, the speed of accessing the execution code EXCD may be increased and performance of the data storage device may be enhanced even though the internal random accessible memory inside the data storage device 3000 is deficient.

Figure 3:
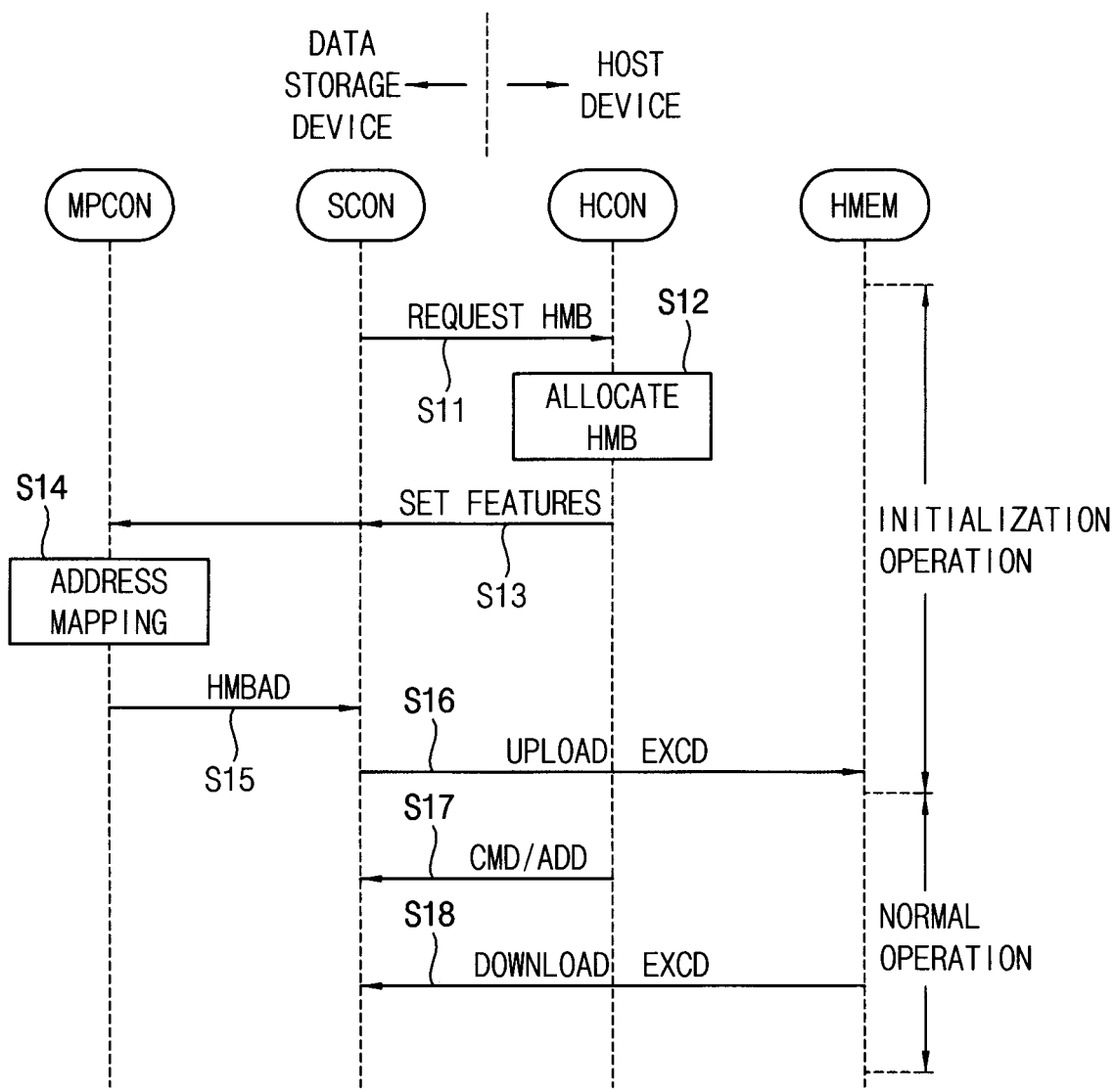
FIG. 3 illustrates a diagram of an initialization operation and a normal operation of a data storage device according to embodiments of the inventive concepts.

FIG. 3 illustrates a diagram of an initialization operation and a normal operation of a data storage device according to embodiments of the inventive concepts.

An initialization operation indicates a portion of a booting sequence of a system including a data storage device. During the initialization operation after the data storage device is powered on, a sequence of preparing an operational state in which the execution code EXCD may be run by the storage controller SCON is performed. A normal operation indicates a write operation, a read operation and background operations of the data storage device after the initialization operation is completed.

Referring to FIGS. 1 and 3, when the data storage device 3000 is powered on, the storage controller SCON may send a request to use the host memory buffer HMB to host controller HCON (S11). In some example embodiments, the host controller HCON may recognize the storage controller SCON and transfer an identifier to the storage controller SCON so that the storage controller SCON may determine whether the host memory buffer HMB is available. In this case, the storage controller SCON may notify the host controller HCON whether to use the host memory buffer HMB. In some example embodiments, the storage controller SCON may recognize the host controller HCON and send an inquiry to the host controller HCON as to whether the host memory buffer HMB is available. When the storage controller SCON sends the notification or the inquiry about the use of the host memory buffer HMB to the host controller HCON, the storage controller SCON may also request the size of the host memory buffer HMB to the host controller HCON.

The host controller HCON may allocate the host memory buffer HMB (S12) referring to the request from the storage controller SCON. The host controller HCON may notify an allocation result to the storage controller SCON (S13) after allocating a size of the host memory buffer HMB. For example, the host controller HCON may notify the allocation result to the storage controller SCON through a set feature command. The set feature command may include set features such as size information of the host memory buffer HMB or information about whether the host memory buffer HMB is activated. The set features may be provided to storage controller SCON and/or the mapping controller MPCON.

The mapping controller MPCON may perform, referring to the size of the host memory buffer HMB, address mapping (S14) to determine mapping relations between the execution code EXCD and host addresses HMBAD of the host memory buffer HMB to which the execution code EXCD is to be stored. The mapping relations may be stored in the mapping table MPT. The mapping relations or the host addresses HMBAD may be provided to the storage controller SCON (S15) upon the request from the storage controller SCON. The storage controller SCON may upload the execution code EXCD (S16) based on the host addresses HMBAD from the mapping controller MPCON. In some example embodiments, as will be described with reference to FIGS. 4 and 5A, the execution code EXCD may include a plurality of code sections CDSEC1~CDSECN, and the storage controller SCON may upload all of the plurality of code sections CDSEC1~CDSECN to the host memory buffer HMB during the initialization operation of the data storage device 3000.

After the initialization operation is completed, the normal operation may be performed. For example, the host controller HCON may transfer a command CMD and an address ADD to the storage controller SCON (S17). The write operation or the read operation with respect to the nonvolatile memory device NVM may be performed according to the command CMD and the address ADD.

During the normal operation, the storage controller SCON may download the execution code EXCD in realtime from the host memory buffer HMB as it is received from the host memory buffer HMB, to execute the execution code EXCD that is downloaded from the host memory buffer HMB (S18). The storage controller SCON may perform the download of the execution code EXCD based on the host address HMBAD provided from the mapping controller MPCON.

Figure 4:
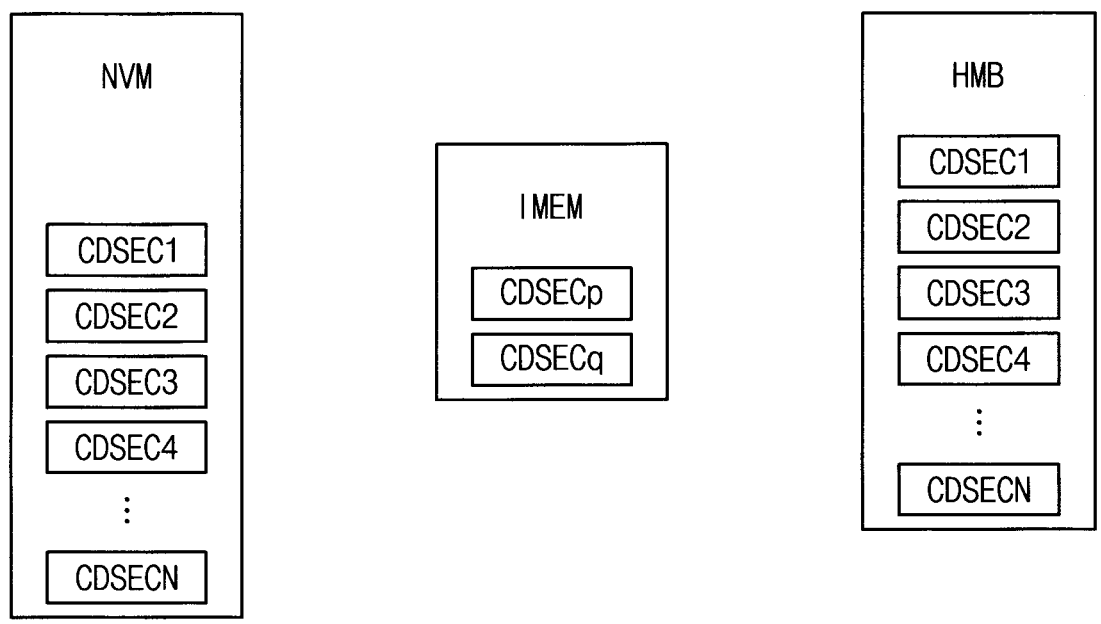
FIG. 4 illustrates a diagram of a memory storage state of a system including a data storage device according to embodiments of the inventive concepts.

FIG. 4 illustrates a diagram of a memory storage state of a system including a data storage device according to embodiments of the inventive concepts.

Referring to FIGS. 1 and 4, the execution code EXCD stored in the nonvolatile memory device NVM may include a plurality of code sections CDSEC1~CDSECN.

The storage controller SCON may load the code sections CDSECp and CDSECq to be executed to an internal memory IMEM to access the code sections CDSECp and CDSECq rapidly. The internal memory IMEM corresponds to the tightly-coupled memory TCM and/or the storage memory SMEM in FIG. 1.

As illustrated in FIG. 4, the storage controller SCON may upload all of the plurality of code sections CDSEC1~CDSECN to the host memory buffer HMB during the initialization operation of the data storage device 3000.

When the code section to be executed is not stored in the internal memory IMEM, the storage controller SCON may access the host memory buffer HMB directly to download the code section to be executed. In some example embodiments, the downloaded code section may replace one of the code sections CDSECp and CDSECq stored in the internal memory IMEM.

FIG. 5A illustrates a diagram of a mapping table included in a data storage device according to embodiments of the inventive concepts.

FIG. 5A represents mapping information S1 of the mapping table MPT corresponding to the memory storage state of FIG. 4. FIG. 5A illustrates an example of the execution code EXCD of eight code sections, that is, first through eighth code sections CDSEC1~CDSEC8 for convenience of illustration and description, and the number of the code sections may be determined variously.

Referring to FIG. 5A, the mapping controller MPCON may store, in the mapping table MPT, the host addresses with respect to uploaded code sections that are uploaded to the host memory buffer HMB among the plurality of code sections CDSEC1~CDSEC8. FIG. 5A illustrates an example that all of the code sections CDSEC1~CDSEC8 are uploaded to the host addresses HMBADa~HMBADh of the host memory buffer HMB, respectively.

In addition, the mapping controller MPCON may store, in the mapping table MPT, internal addresses with respect to the code sections stored in the internal memory IMEM among the plurality of code sections CDSEC1~CDSEC8. FIG. 5A illustrates a case that the sixth code section CDSEC6 is stored at the internal address IMADp of the internal memory IMEM and the third code section CDSEC3 is stored at the internal address IMADq of the internal memory IMEM.

The storage controller SCON may access the code sections based on the mapping information S1 stored in the mapping table MPT. In some example embodiments, the storage controller SCON may access the internal memory IMEM when the code section to be executed is stored in the internal memory IMEM. The storage controller SCON may access the code section in the host memory buffer HMB based on the mapping information S1 only if the code section to be executed is not stored in the internal memory IMEM.

Figure 5B:
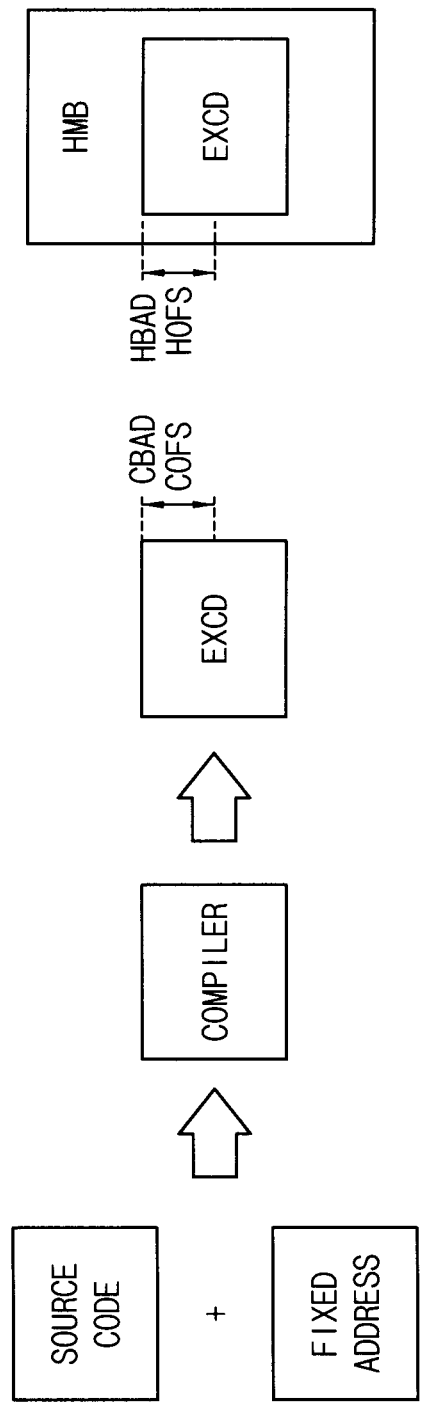
FIG. 5B illustrates a diagram descriptive of mapping relations of the mapping table of FIG. 5A.

FIG. 5B illustrates a diagram descriptive of mapping relations of the mapping table of FIG. 5A.

Referring to FIG. 5B, a compiler may generate an execution code EXCD based on a source code and a fixed address that is an internal address fixed to the data storage device. The compiler may be executed by a computing system and the generated execution code EXCD may be stored in the nonvolatile memory device NVM in advance. The compiler may generate the execution code EXCD based on a code base address CBAD. The execution code EXCD may not be based on the host address HMBAD because the host address HMBAD of the host memory buffer HMB is varied depending on the host device. Accordingly, the code section and the corresponding host address HMBAD may be determined by mapping the code base address CBAD to a host base address HBAD of various host devices. For example, each address of each code section may be represented by a code address offset COFS corresponding to a difference between the address of each code section and the code base address CBAD. In this case, the host address HMBAD corresponding to each code section may be determined based on the host base address HBAD and a host address offset HOFS.

Figure 6:
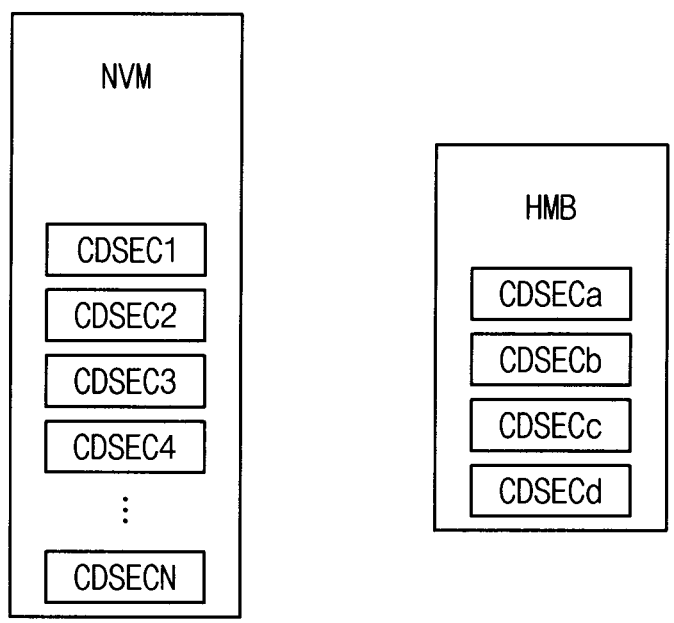
FIG. 6 illustrates a diagram of a memory storage state of a system including a data storage device according to embodiments of the inventive concepts.

FIG. 6 illustrates a diagram of a memory storage state of a system including a data storage device according to embodiments of the inventive concepts.

Referring to FIGS. 1 and 6, the execution code EXCD stored in the nonvolatile memory device NVM may include a plurality of code sections CDSEC1~CDSECN.

Even though not illustrated in FIG. 6, the storage controller SCON may load the code sections to be executed to the internal memory IMEM from the nonvolatile memory device NVM as described with reference to FIG. 4.

As illustrated in FIG. 6, the storage controller SCON may upload a portion of the plurality of code sections CDSEC1~CDSECN to the host memory buffer HMB during the initialization operation of the data storage device or during the normal operation after the initialization operation is completed. This example may correspond to a case when the host controller HCON does not provide a sufficient size of host memory buffer HMB to (or for) the data storage device. The storage controller SCON may perform an updating operation to replace the uploaded code sections CDSECa, CDSECb, CDSECc and CDSECd stored in the host memory buffer HMB with other code sections among the plurality of code sections CDSEC1~CDSECN.

Figure 7:
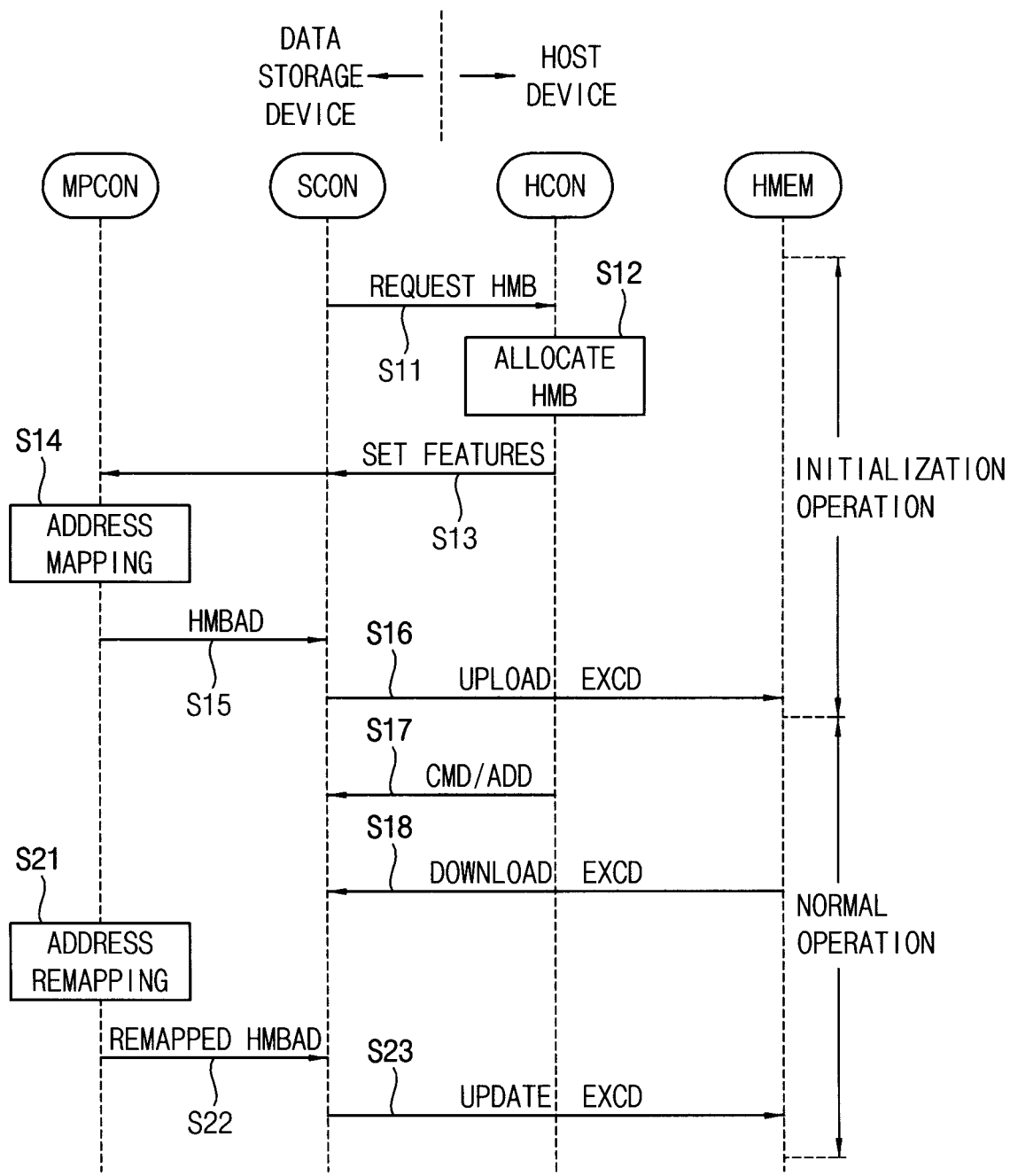
FIG. 7 illustrates a diagram of an initialization operation and a normal operation of a data storage device according to embodiments of the inventive concepts.

FIG. 7 illustrates a diagram of an initialization operation and a normal operation of a data storage device according to embodiments of the inventive concepts.

Referring to FIGS. 1 and 7, when the data storage device 3000 is powered on, the storage controller SCON may send a request to use the host memory buffer HMB to host controller HCON (S11). In some example embodiments, the host controller HCON may recognize the storage controller SCON and transfer an identifier to the storage controller SCON so that the storage controller SCON may determine whether the host memory buffer HMB is available. In this case, the storage controller SCON may notify the host controller HCON whether to use the host memory buffer HMB. In some example embodiments, the storage controller SCON may recognize the host controller HCON and send an inquiry to the host controller HCON as to whether the host memory buffer HMB is available. When the storage controller SCON sends the notification or the inquiry about the use of the host memory buffer HMB to the host controller HCON, the storage controller SCON may also request the size of the host memory buffer HMB to the host controller HCON.

The host controller HCON may allocate the host memory buffer HMB (S12) referring to the request from the storage controller SCON. The host controller HCON may notify an allocation result to the storage controller SCON (S13) after allocating a size of the host memory buffer HMB. For example, the host controller HCON may notify the allocation result to the storage controller SCON through a set feature command. The set feature command may include set features such as size information of the host memory buffer HMB or information about whether the host memory buffer HMB is activated. The set features may be provided to storage controller SCON and/or the mapping controller MPCON.

The mapping controller MPCON may perform, referring to the size of the host memory buffer HMB, address mapping (S14) to determine mapping relations between the execution code EXCD and host addresses HMBAD of the host memory buffer HMB to which the execution code EXCD is to be stored. The mapping relations may be stored in the mapping table MPT. The mapping relations or the host addresses HMBAD may be provided to the storage controller SCON (S15) upon the request from the storage controller SCON. The storage controller SCON may upload the execution code EXCD (S16) based on the host addresses HMBAD from the mapping controller MPCON. In some example embodiments, as will be described below with reference to FIGS. 8A, 8B, 9A and 9B, the execution code EXCD may include a plurality of code sections CDSEC1~CDSECN, and the storage controller SCON may upload a portion of the plurality of code sections CDSEC1~CDSECN to the host memory buffer HMB during the initialization operation of the data storage device 3000 or during the normal operation after the initialization operation is completed.

After the initialization operation is completed, the normal operation may be performed. For example, the host controller HCON may transfer a command CMD and an address ADD to the storage controller SCON (S17). The write operation or the read operation with respect to the nonvolatile memory device NVM may be performed according to the command CMD and the address ADD.

During the normal operation, the storage controller SCON may download the execution code EXCD in realtime from the host memory buffer HMB as it is received from the host memory buffer HMB, to execute the execution code EXCD that is downloaded from the host memory buffer HMB (S18). The storage controller SCON may perform the download of the execution code EXCD based on the host address HMBAD provided from the mapping controller MPCON.

In addition, if the code section to be executed is not loaded in the internal memory IMEM and the host memory buffer HMB, the storage controller SCON may perform an updating operation to replace the uploaded code sections CDSECa, CDSECb, CDSECc and CDSECd stored in the host memory buffer HMB with other code sections among the plurality of code sections CDSEC1~CDSECN. The mapping controller MPCON performs address remapping (S21) according to the updating operation and the storage controller SCON receives the remapped host address HMBAD for the updating operation from the mapping controller MPCON (S22). The storage controller SCON may perform the updating operation (S23) to replace the execution code EXCD stored in the host memory buffer HMB by uploading the new code section based on the remapped host address.

FIGS. 8A and 8B illustrates diagrams of a memory storage state of a system including a data storage device according to embodiments of the inventive concepts.

FIGS. 8A and 8B illustrate an example wherein at least a portion of the uploaded code sections stored in the host memory buffer HMB overlaps with the code sections stored in the internal memory IMEM.

FIG. 8A represents mapping information S2 of the mapping table MPT corresponding to the memory storage state of FIG. 6, and FIG. 8B illustrates mapping information S3 of the mapping table MPT after an updating operation is performed. FIGS. 8A and 8B illustrate an example of the execution code EXCD of eight code sections, that is, first through eighth code sections CDSEC1~CDSEC8 for convenience of illustration and description, however the number of the code sections may be determined variously such that any number of code sections may be included.

Referring to FIG. 8A, the mapping controller MPCON may store, in the mapping table MPT, the host addresses with respect to uploaded code sections that are uploaded to the host memory buffer HMB among the plurality of code sections CDSEC1~CDSEC8. FIG. 8A illustrates an example that the code sections CDSEC1, CDSEC3, CDSEC5 and CDSEC6 are uploaded to the host addresses HMBADd, HMBADb, HMBADa and HMBADc of the host memory buffer HMB, respectively.

In addition, the mapping controller MPCON may store, in the mapping table MPT, internal addresses with respect to the code sections stored in the internal memory IMEM among the plurality of code sections CDSEC1~CDSEC8. FIG. 8A illustrates an example that the sixth code section CDSEC6 is stored at the internal address IMADp of the internal memory IMEM and the third code section CDSEC3 is stored at the internal address IMADq of the internal memory IMEM.

The storage controller SCON may access the code sections based on the mapping information S2 stored in the mapping table MPT. In some example embodiments, the storage controller SCON may access the internal memory IMEM when the code section to be executed is stored in the internal memory IMEM. The storage controller SCON may access the code section in the host memory buffer HMB based on the mapping information S2 if the code section to be executed is not stored in the internal memory IMEM. When the code section to be executed is not stored in the internal memory IMEM and the host memory buffer HMB, the storage controller SCON may perform the above-described updating operation of the code section.

In some example embodiments, the mapping controller MPCON may store priority information in the mapping table MPT, where the priority information represents access importance or access frequency of the plurality of code sections CDSEC1~CDSEC8. The mapping controller MPCON may provide, based on the priority information, an address of the uploaded code section having a lowest priority among the uploaded code sections to the storage controller SCON.

In FIG. 8A, the priority may be higher as the value of the priority information is lower. In other words, among the uploaded code sections CDSEC1, CDSEC3, CDSEC5 and CDSEC6, the fifth code section CDSEC5 has the lowest priority and the third code section CDSEC3 has the highest priority. When it is required to upload a new code section but the free memory space of the host memory buffer HMB is however deficient, the fifth code section CDSEC5 having the lowest priority may be replaced with the new code section.

FIG. 8B illustrates mapping information S3 of the mapping table MPT after the fifth code section CDSEC5 in the host memory buffer HMB is replaced with the eighth code section CDSEC8. As illustrated in FIGS. 8A and 8B, also the priority information may be updated after the updating operation of the code section is completed. FIGS. 8A and 8B illustrate that the code section that has been uploaded most recently has the higher priority, but example embodiments are not limited thereto.

FIGS. 9A and 9B illustrate diagrams of a memory storage state of a system including a data storage device according to other embodiments of the inventive concepts.

FIGS. 9A and 9B illustrate an example wherein the uploaded code sections in the host memory buffer HMB do not overlap with the code sections in the internal memory IMEM.

FIG. 9A represents mapping information S4 of the mapping table MPT corresponding to the memory storage state of FIG. 6, and FIG. 9B illustrates mapping information S5 of the mapping table MPT after an updating operation is performed. FIGS. 9A and 9B illustrate an example of the execution code EXCD of eight code sections, that is, first through eighth code sections CDSEC1~CDSEC8 for convenience of illustration and description, however the number of the code sections may be determined variously such that any number of code sections may be included.

Referring to FIG. 9A, the mapping controller MPCON may store, in the mapping table MPT, the host addresses with respect to uploaded code sections that are uploaded to the host memory buffer HMB among the plurality of code sections CDSEC1~CDSEC8. FIG. 9A illustrates an example that the code sections CDSEC1, CDSEC3, CDSEC5 and CDSEC8 are uploaded to the host addresses HMBADd, HMBADb, HMBADa and HMBADc of the host memory buffer HMB, respectively.

In addition, the mapping controller MPCON may store, in the mapping table MPT, internal addresses with respect to the code sections stored in the internal memory IMEM among the plurality of code sections CDSEC1~CDSEC8. FIG. 9A illustrates an example that the sixth code section CDSEC6 is stored at the internal address IMADp of the internal memory IMEM.

The storage controller SCON may access the code sections based on the mapping information S4 stored in the mapping table MPT. In some example embodiments, the storage controller SCON may access the internal memory IMEM when the code section to be executed is stored in the internal memory IMEM. The storage controller SCON may access the code section in the host memory buffer HMB based on the mapping information S4 if the code section to be executed is not stored in the internal memory IMEM. When the code section to be executed is not stored in the internal memory IMEM and the host memory buffer HMB, the storage controller SCON may perform the above-described updating operation of the code section.

In some example embodiments, the mapping controller MPCON may store priority information in the mapping table MPT, where the priority information represents access importance or access frequency of the plurality of code sections CDSEC1~CDSEC8. In comparison with FIGS. 8A and 8B, the priority information on the code sections that are not uploaded to the host memory buffer HMB may be omitted. The mapping controller MPCON may provide, based on the priority information, an address of the uploaded code section having a lowest priority among the uploaded code sections to the storage controller SCON.

In FIG. 9A, the priority may be higher as the value of the priority information is lower. In other words, among the uploaded code sections CDSEC1, CDSEC3, CDSEC5 and CDSEC8, the fifth code section CDSEC5 has the lowest priority and the third code section CDSEC3 has the highest priority. When it is required to upload a new code section but the free memory space of the host memory buffer HMB is however deficient, the fifth code section CDSEC5 having the lowest priority may be replaced with the new code section.

FIG. 9B illustrates mapping information S5 of the mapping table MPT after the fifth code section CDSEC5 in the host memory buffer HMB is replaced with the seventh code section CDSEC7. As illustrated in FIGS. 9A and 9B, also the priority information may be updated after the updating operation of the code section is completed. FIGS. 9A and 9B illustrate that the code section that has been uploaded most recently has the higher priority, but example embodiments are not limited thereto.

Figure 10:
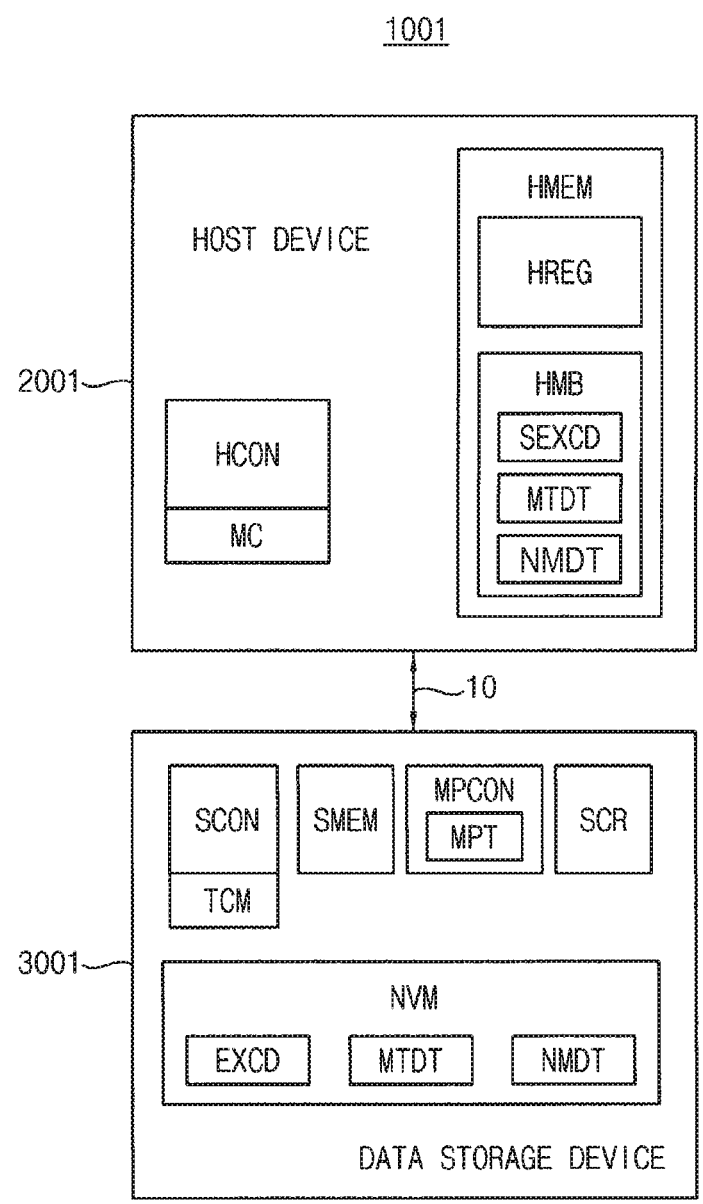
FIG. 10 illustrates a block diagram of a system including a data storage device according to embodiments of the inventive concepts.

FIG. 10 illustrates a block diagram of a system including a data storage device according to embodiments of the inventive concepts.

Referring to FIG. 10, a system 1001 includes a host device 2001 and a data storage device 3001. The host device 2001 includes a host controller HCON and a host memory HMEM. The data storage device 3001 includes a storage controller SCON, a storage memory SMEM, a mapping controller MPCON, a security engine SCR and a nonvolatile memory device NVM.

The system 1001 of FIG. 10 is substantially the same as the system 1000 of FIG. 1 except the security engine SCR, and description of structure and functionality in FIG. 10 that is the same as in FIG. 1 is hereinafter omitted.

The security engine SCR may encode the execution code EXCD provided from the nonvolatile memory device NVM to generate a secured execution code SEXCD. The storage controller SCON may upload the secured execution code SEXCD to the host memory buffer HMB.

In addition, the security engine SCR may decode the secured execution code SEXCD that is downloaded in realtime from the host memory buffer HMB to provide the execution code EXCD to the storage controller SCON.

In some example embodiments, encoding may correspond to encryption and decoding may correspond to decryption. In some example embodiments, encoding may correspond to randomizing and decoding may correspond to derandomizing. In some example embodiments, encoding may correspond to encryption and randomizing, and decoding may correspond to decryption and derandomizing.

As the system is configured to support that the execution code EXCD is uploaded to the host memory buffer HMB, the execution code EXCD may be exposed to hacking. For example, when the execution code EXCD is uploaded to the host memory buffer HMB, the communication between the host device 2001 and the data storage device 3001 may be detected by a hacker who may then attempt to hack the execution code EXCD. In addition, the host memory buffer HMB may be hacked after the execution code EXCD is uploaded to the host memory buffer HMB, and the execution code EXCD may be exposed to the hacker.

If the execution code EXCD is exposed, the policy of the data storage device 3001 for the write operation, the read operation and the background operations may be exposed and security of the data storage device 3001 may be degraded.

The security engine SCR may be included in the data storage device 3001 to enhance security and prevent exposure of the execution code EXCD.

The data storage device and the method of operating the data storage device according to example embodiments may enhance security of the data storage device 3001, and the system 1001 including the data storage device 3001, by encoding the execution code EXCD and uploading the secured execution code SEXCD to the host memory buffer HMB.

Figure 11:
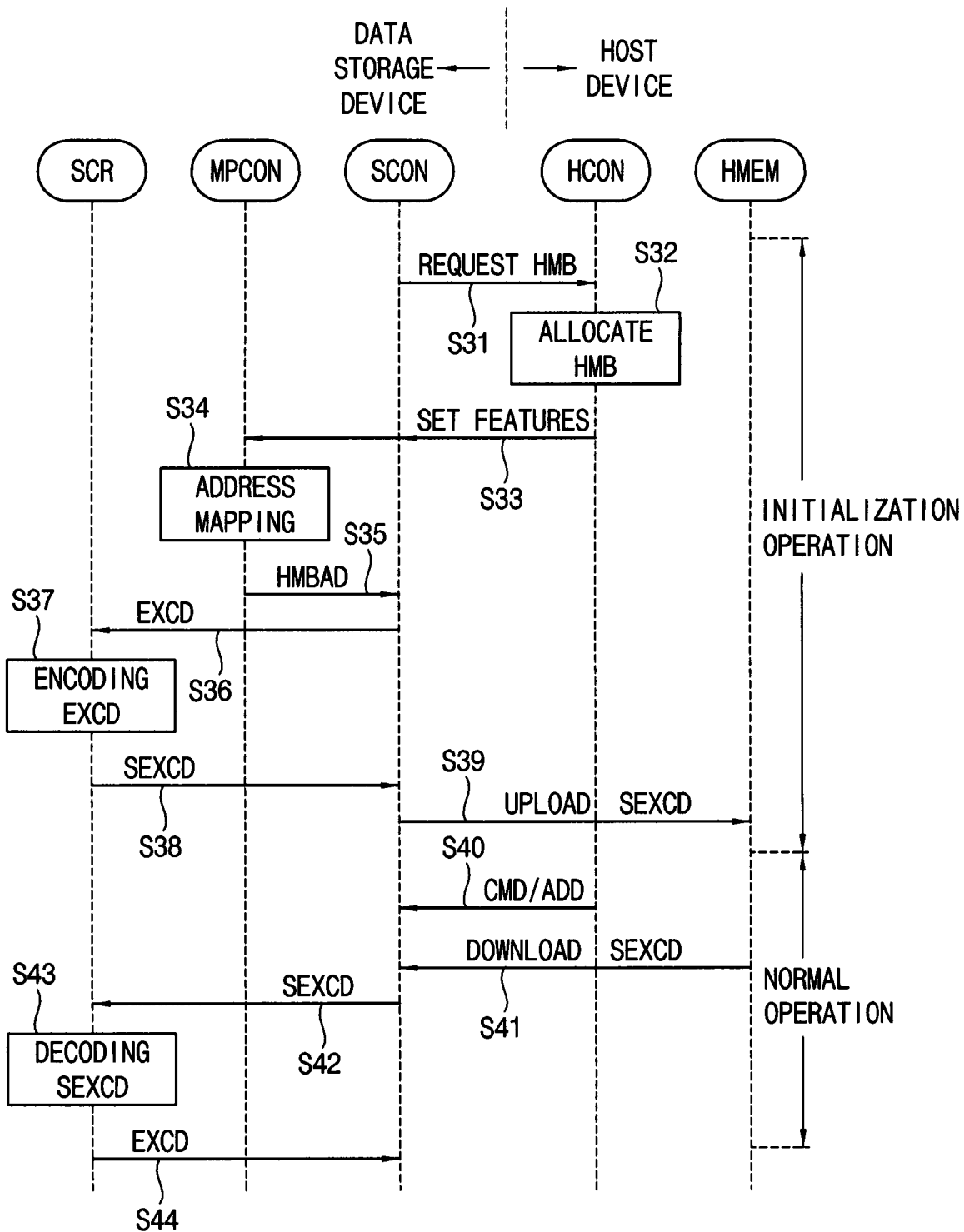
FIG. 11 illustrates a diagram of an initialization operation and a normal operation of a data storage device according to embodiments of the inventive concepts.

FIG. 11 illustrates a diagram of an initialization operation and a normal operation of a data storage device according to embodiments of the inventive concepts.

Referring to FIGS. 10 and 11, when the data storage device 3001 is powered on, the storage controller SCON may send a request to use the host memory buffer HMB to host controller HCON (S31). In some example embodiments, the host controller HCON may recognize the storage controller SCON and transfer an identifier to the storage controller SCON so that the storage controller SCON may determine whether the host memory buffer HMB is available. In this case, the storage controller SCON may notify the host controller HCON whether to use the host memory buffer HMB. In some example embodiments, the storage controller SCON may recognize the host controller HCON and send an inquiry to the host controller HCON as to whether the host memory buffer HMB is available. When the storage controller SCON sends the notification or requires about the use of the host memory buffer HMB to the host controller HCON, the storage controller SCON may also request the size of the host memory buffer HMB to the host controller HCON.

The host controller HCON may allocate the host memory buffer HMB (S32) referring to the request from the storage controller SCON. The host controller HCON may notify an allocation result to the storage controller SCON (S33) after allocating a size of the host memory buffer HMB. For example, the host controller HCON may notify the allocation result to the storage controller SCON through a set feature command. The set feature command may include set features such as size information of the host memory buffer HMB or information about whether the host memory buffer HMB is activated. The set features may be provided to storage controller SCON and/or the mapping controller MPCON.

The mapping controller MPCON may perform, referring to the size of the host memory buffer HMB, address mapping (S34) to determine mapping relations between the execution code EXCD and host addresses HMBAD of the host memory buffer HMB to which the execution code EXCD is to be stored. The mapping relations may be stored in the mapping table MPT. The mapping relations or the host addresses HMBAD may be provided to the storage controller SCON (S35) upon the request from the storage controller SCON. The storage controller SCON may provide the execution code EXCD to the security engine SCR (S36) and the security engine SCR may perform encoding of the execution code EXCD (S37) and provide the secured execution code SEXCD to the storage controller SCON (S38). The storage controller SCON may upload the secured execution code SEXCD (S39) based on the host addresses HMBAD from the mapping controller MPCON.

After the initialization operation is completed, the normal operation may be performed. For example, the host controller HCON may transfer a command CMD and an address ADD to the storage controller SCON (S40). The write operation or the read operation with respect to the nonvolatile memory device NVM may be performed according to the command CMD and the address ADD.

During the normal operation, the storage controller SCON may download the secured execution code SEXCD in realtime from the host memory buffer HMB (S41) as it is received from the host memory buffer HMB, and provide the secured execution code SEXCD to the security engine SCR (S42). The security engine SCR may perform decoding of the secured execution code SEXCD (S43) and provide the execution code EXCD corresponding to the secured execution code SEXCD to the storage controller SCON (S44). The storage controller SCON may execute the execution code EXCD provided from the security engine SCR.

Figure 12:
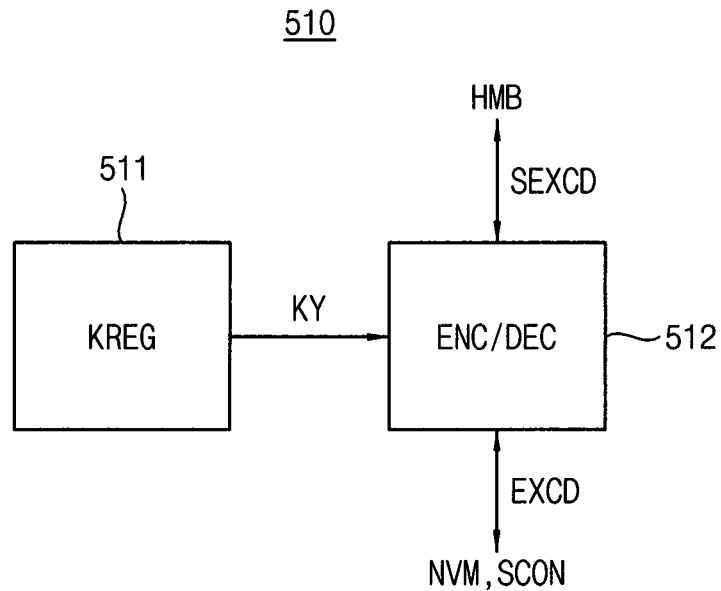
FIG. 12 illustrates a block diagram of a security engine included in the data storage device of FIG. 10.

FIG. 12 illustrates a block diagram of a security engine included in the data storage device of FIG. 10.

Referring to FIG. 12, security engine 510 includes a key register KREG 511 and an encrypting and decrypting unit ENC/DEC 512.

The key register 511 may store a security key KY and provide the security key KY to the encrypting and decrypting unit 512. The encrypting and decrypting unit 512 may encrypt the execution code EXCD provided from the nonvolatile memory device NVM or the storage controller SCON based on the security key KY, to provide the secured execution code SEXCD to the host memory buffer HMB. In addition, the encrypting and decrypting unit 512 may decrypt the secured execution code SEXCD provided from the host memory buffer HMB, to provide the execution code EXCD to the nonvolatile memory device NVM of the storage controller.

Figure 13A:
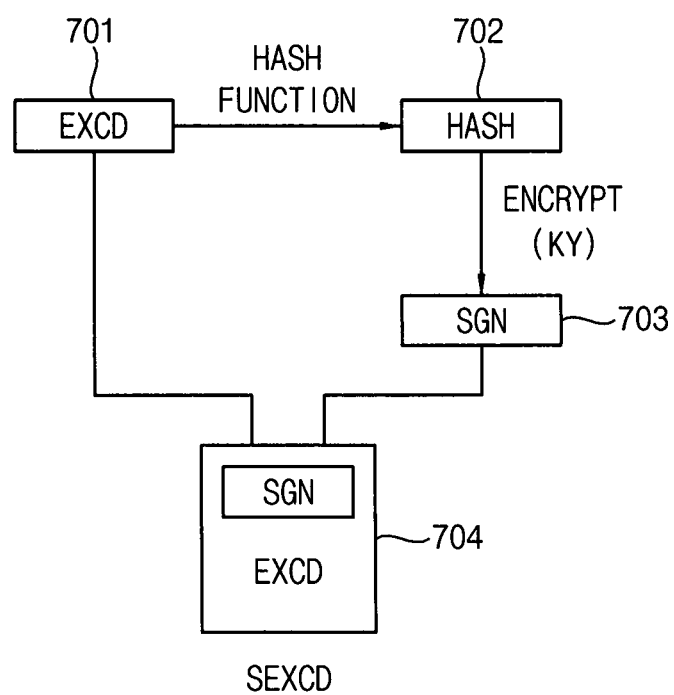
FIG. 13A illustrates a diagram of an encrypting operation of the security engine of FIG. 12.
Figure 13B:
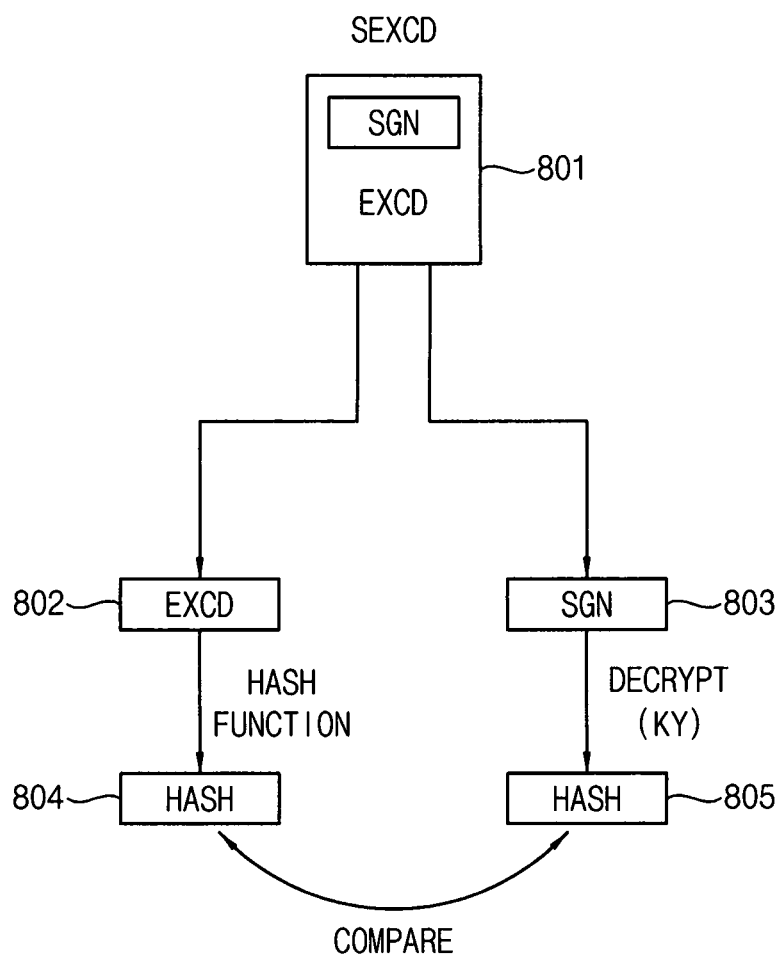
FIG. 13B illustrates a diagram of a decrypting operation of the security engine of FIG. 12.

FIG. 13A illustrates a diagram of an encrypting operation of the security engine of FIG. 12. FIG. 13B illustrates a diagram of a decrypting operation of the security engine of FIG. 12.

Referring to FIGS. 12 and 13A, the encrypting and decrypting unit 512 may generate an encrypted signature SGN with respect to the execution code EXCD based on the security key KY, and combine the encrypted signature SGN in the secured execution code SEXCD. For example, the encrypting and decrypting unit 512 may calculate a hash value 702 by applying a hash function to the execution code EXCD 701. In some example embodiments, the encrypting and decrypting unit 512 may generate the encrypted signature SGN 703 by encrypting the hash value 702 using the private key KY that is not disclosed to the public. The encrypted signature 703 may be attached to the execution code EXCD 701, and the execution code EXCD 701 including the encrypted signature SGN 703 may be provided to the host memory buffer HMB as the secured execution code SEXCD 704.

Referring to FIGS. 12 and 13B, the encrypting and decrypting unit 512 may decrypt the encrypted (i.e., secured) signature SGN in the secured execution code SEXCD to generate a decryption signature and provide the execution code EXCD based on the decryption signature. For example, the encrypting and decrypting unit 512 may receive the secured execution code SEXCD 801 including the secured signature SGN from the host memory buffer HMB. As described above, the secured execution code SEXCD 801 may include the execution code EXCD 802 and the secured signature SGN 803. The security engine SCR may calculate a hash value 804 by applying a hash function to the execution code EXCD 802. The security engine SCR may decrypt the secured signature SGN 803 using the private key KY, and calculate a hash value 805 by applying a hash function to the decrypted secured signature SGN. When the hash value 804 of the execution code EXCD 802 is identical to the hash value 805 of the decrypted secured signature SGN, the security engine SCR may verify the block integrity of the secured execution code SEXCD 801.

Figure 14:
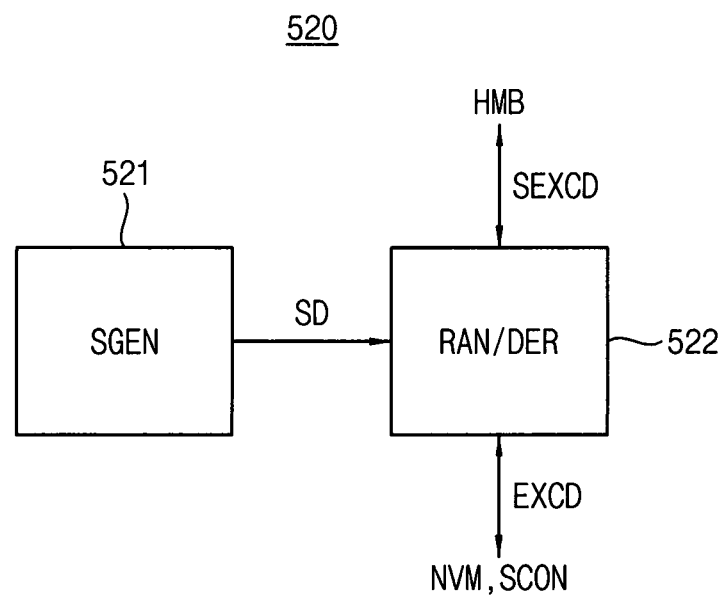
FIG. 14 illustrates a block diagram of a security engine included in the data storage device of FIG. 10 according to embodiments of the inventive concepts.
Figure 15:
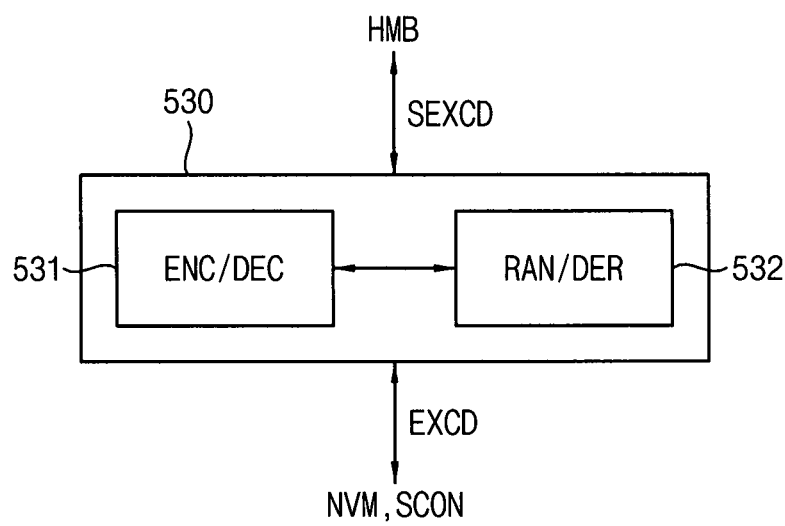
FIG. 15 illustrates a block diagram of a security engine included in the data storage device of FIG. 10 according to other embodiments of the inventive concepts.

FIGS. 14 and 15 illustrate block diagrams of security engines included in the data storage device of FIG. 10.

Referring to FIG. 14, a security engine 520 includes a seed generator SGEN 521 that generates a seed value SD and a randomizing and derandomizing unit RAN/DER 522. The randomizing and derandomizing unit 522 may randomize the execution code EXCD provided from the nonvolatile memory device NVM or the storage controller SCON based on the seed value SD to provide the secured execution code SEXCD to the host memory buffer HMB. The randomizing and derandomizing unit 522 may also derandomize the secured execution code SEXCD provided from the host buffer memory HMB, to provide the execution code EXCD to the nonvolatile memory device NVM or the storage controller SCON.

Referring to FIG. 15, a security engine 530 include an encrypting and decrypting unit 531 as described with reference to FIGS. 12, 13A and 13B and a randomizing and derandomizing unit 532 as described with reference to FIG. 14.

In some example embodiments, the security engine 530 may perform encryption of the execution code EXCD firstly to provide an encrypted code, and then perform randomizing of the encrypted code to provide the secured execution code SEXCD. In this case, the security engine 530 may perform derandomizing of the secured execution code SEXCD firstly, and then perform decryption of the derandomized code to provide the execution code EXCD.

In some example embodiments, the security engine 530 may perform randomizing of the execution code EXCD firstly to provide a randomized code, and then perform encryption of the randomized code to provide the secured execution code SEXCD. In this case, the security engine 530 may perform decryption of the secured execution code SEXCD firstly, and then perform derandomizing of the decrypted code to provide the execution code EXCD.

Figure 16:
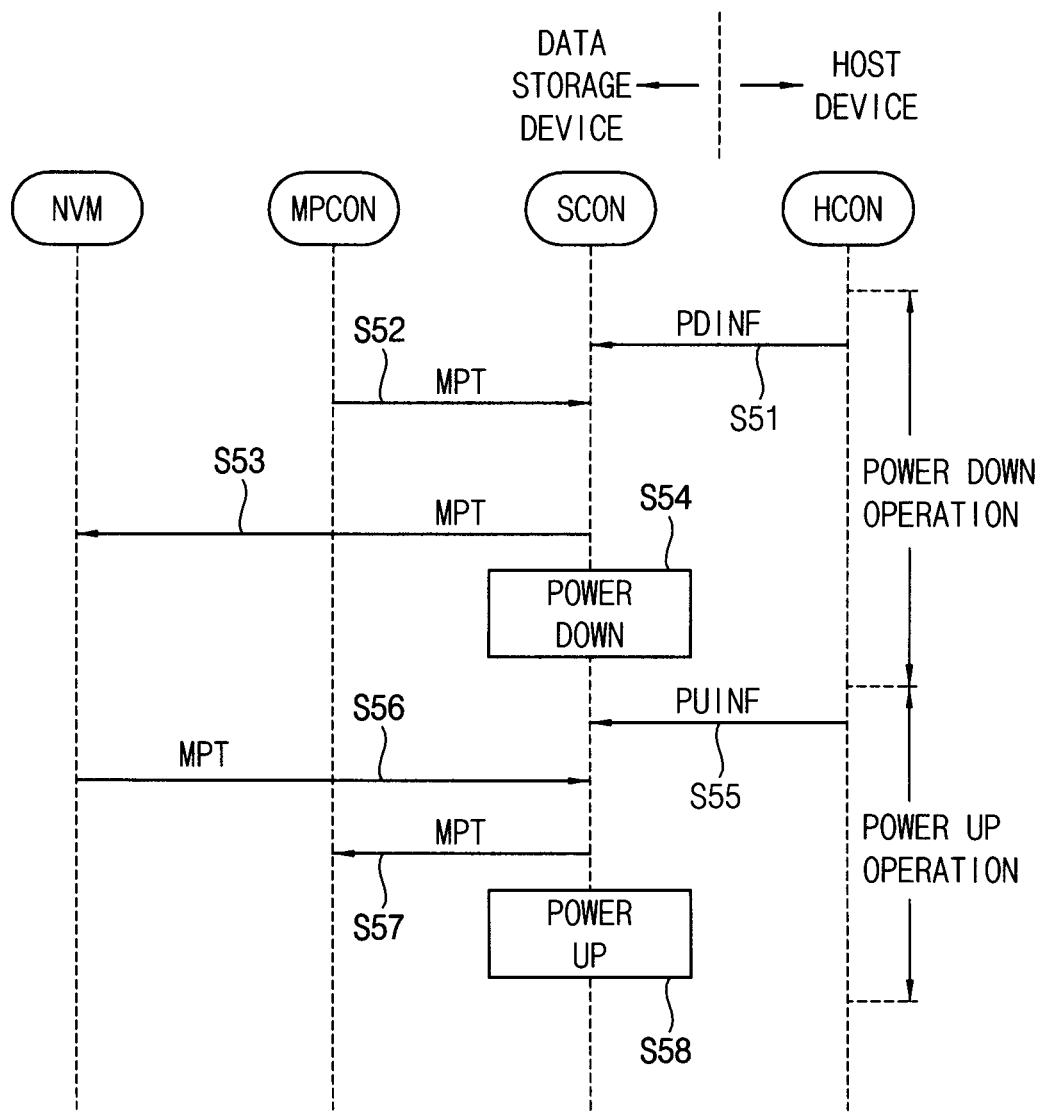
FIG. 16 illustrates a diagram of a power down operation and a power up operation of a data storage device according to embodiments of the inventive concepts.

FIG. 16 illustrates a diagram of a power down operation and a power up operation of a data storage device according to embodiments of the inventive concepts.

Referring to FIGS. 1 and 16, the storage controller SCON may receive power-down information PDINF from the host controller HCON (S51). After receiving the power-down information PDIN, the storage controller SCON may receive the mapping table MPT from the mapping controller MPCON (S52) and store the mapping table MPT in the nonvolatile memory device NVM (S53). After that, the storage controller SCON may perform other processes for the power down operation (S54).

As such, the storage controller SCON may store the mapping table MPT in the nonvolatile memory device NVM before the data storage device 3000 enters the power-down mode.

In the power-down mode, the storage controller SCON may receive power-up information PUINF from the host controller HCON (S55). After receiving the power-up information PUINF, the storage controller SCON may read out the mapping table MPT from the nonvolatile memory device NVM (S56) and store the mapping table MPT in the mapping controller MPCON (S57). The storage controller SCON may access the execution code EXCD based on the restored mapping table MPT and the storage controller SCON may perform other processes for the power up operation (S58).

As such, the storage controller SCON may load the mapping table MPT stored in the nonvolatile memory device NVM and download the execution code EXCD stored in the host memory buffer HMB based on the mapping table MPT, when the data storage device is awakened from the power-down mode.

During the power-up sequence, the reloading of the execution code EXCD to the host memory buffer HMB may be omitted to reduce the power-up procedure and thus the performance of the data storage device may be enhanced.

Figure 17:
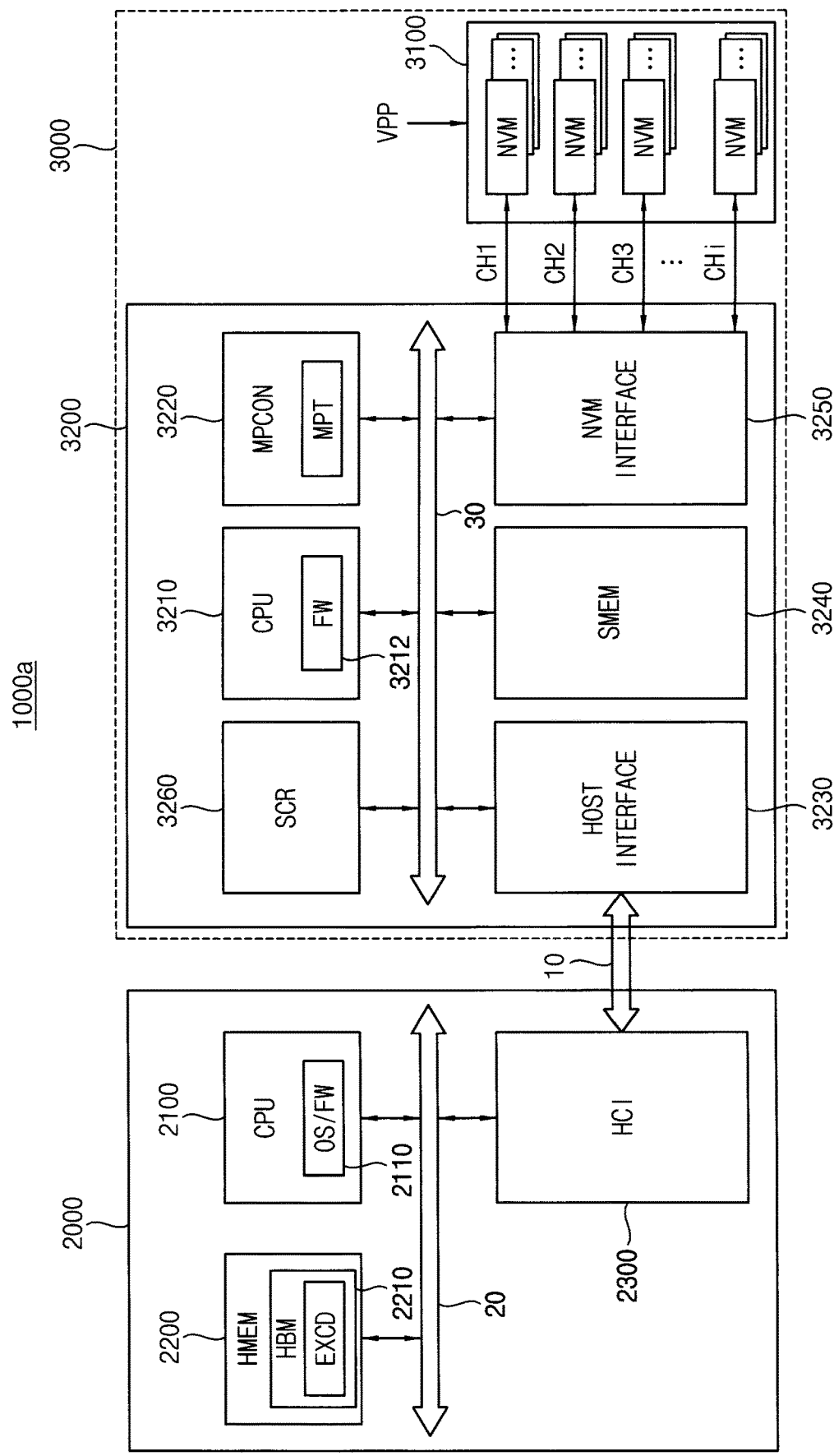
FIG. 17 illustrates a block diagram of a system including a data storage device according to embodiments of the inventive concepts.

FIG. 17 illustrates a block diagram of a system including a data storage device according to embodiments of the inventive concepts.

Referring to FIG. 17, a system 1000a includes a host device 2000 and a storage device 3000. For example, the storage device 3000 may be an embedded multimedia card (eMMC), a solid state drive (SSD), or the like.

The host device 2000 may be configured to control data processing operations, such as data read operations and data write operations. The system 1000a of FIG. 17 may be an arbitrary electronic system.

The host device 2000 includes a processor (CPU) 2100, a host memory (HMEM) 2200 and a host controller interface (HCI) 2300 connected through a bus 20. The host memory 2200 includes a host memory buffer HMB 2210 that stores an execution code EXCD. An operating system (OS) and/or host firmware (FW) 2110 may be executed by the processor 2100. The processor 2100 may include hardware and/or software for controlling generation of a command CMD, analysis of a response RES, storing of data in a register, e.g., an extended (EXT)_CSD register (not shown) of the storage device 3000, and/or data processing. The processor 2100 may execute the operating system and the host firmware 2110 to perform these operations.

The host controller interface 2300 may interface with the storage device 3000. For example, the host controller interface 2300 is configured to issue the command CMD to the storage device 3000, receive the response RES to the command CMD from the storage device 3000, transmit write data to the storage device 3000, and receive read data from the storage device 3000.

The storage device 3000 may include multiple nonvolatile memory devices (NVM) 3100 and a storage controller 3200.

The nonvolatile memory devices 3100 may be optionally supplied with an external high voltage VPP. The storage controller 3200 may be connected to the nonvolatile memory devices 3100 through multiple channels CH1 to CHi. The storage controller 3200 includes one or more processors CPU 3210, a mapping controller MPCON 3220, a host interface 3230, a storage memory SMEM 3240, a nonvolatile memory interface 3250 and a security engine SCR 3260 connected through a bus 30.

The storage memory 3240 may store data used to operate the storage controller 3200. The storage memory 3240 may be a volatile memory device such as for example dynamic random access memory (DRAM), static random access memory (SRAM), or the like. Although FIG. 17 illustrates an embodiment where the storage memory 3240 is included in the storage controller 3200, the storage memory 3240 is not limited thereto. For example, the storage memory 3240 may be placed outside the storage controller 3200.

The processor 3210 is configured to control overall operations of the storage controller 3200. For example, the processor 3210 may operate firmware 3212 including a flash translation layer (FTL), and may include other firmware. The FTL may perform various functions, e.g., address mapping, read calibration, error correction, among other functions.

The security engine 3260 may perform encoding of the execution code EXCD and decoding of the secured execution code SEXCD as described above. Although FIG. 17 shows that the security engine 3260 is outside the host interface 3230, the security engine 3260 may be included in the host interface 3230.

The host interface 3230 may provide an interface with external devices such as the host device 2000. The nonvolatile memory interface 3250 may provide an interface with the nonvolatile memory devices 3100. The host device 2000 and the storage device 3000 may be connected through a bus 10.

Figure 18:
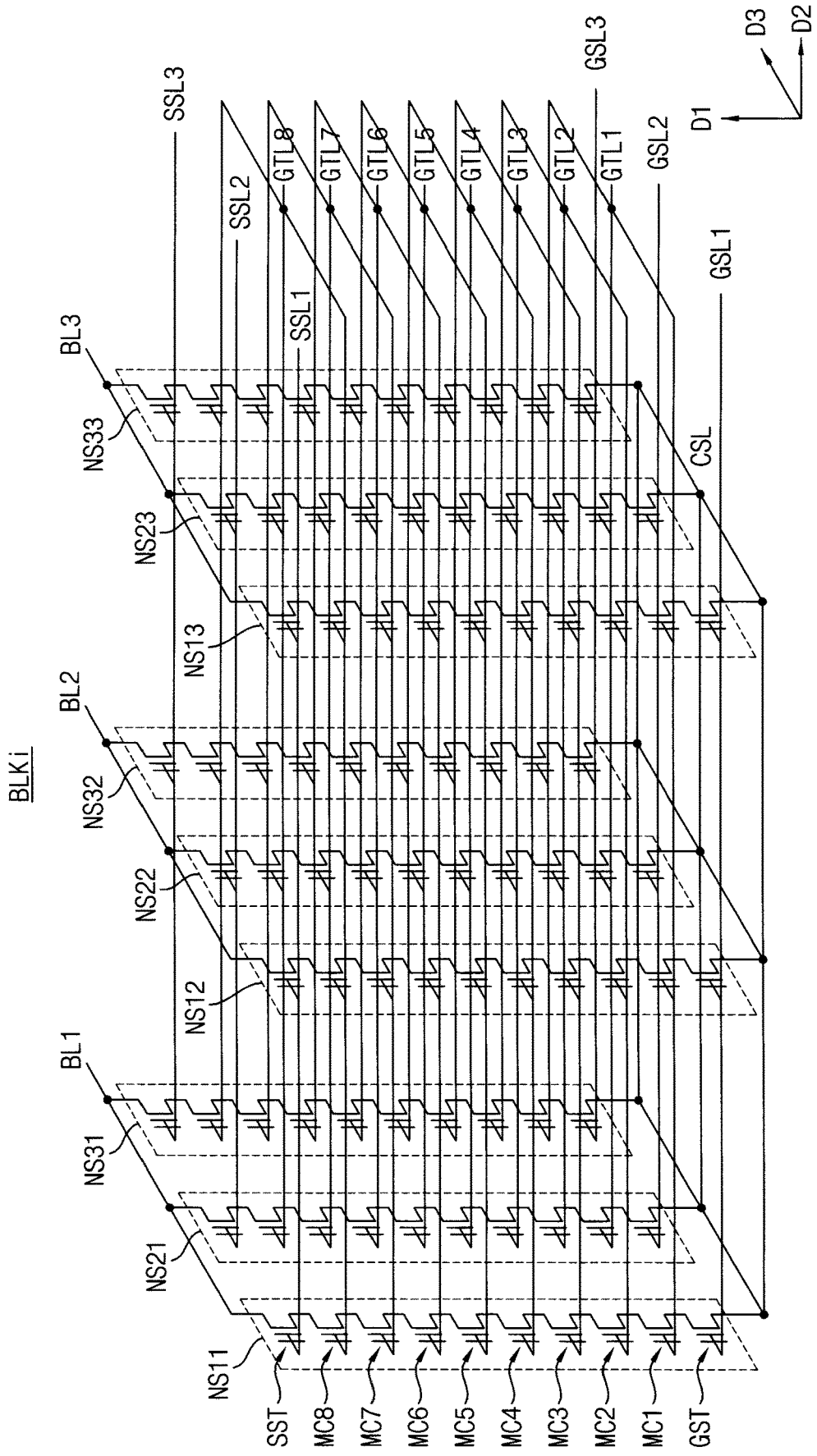
FIG. 18 illustrates a circuit diagram of an equivalent circuit of a nonvolatile memory device included in the data storage device of FIG. 17.

FIG. 18 illustrates a circuit diagram of an equivalent circuit of a nonvolatile memory device included in the data storage device of FIG. 17.

The memory block BLKi of FIG. 18 may be formed on a substrate in a three-dimensional structure (or a vertical structure). For example, a plurality of NAND strings or cell strings included in the memory block BLKi may be formed in the first direction D1 perpendicular to the upper surface of the substrate.

Referring to FIG. 18, the memory block BLKi may include NAND strings NS11 to NS33 coupled between bit lines BL1, BL2 and BL3 and a common source line CSL. Each of the NAND strings NS11 to NS33 may include a string selection transistor SST, a plurality of memory cells MC1 to MC8, and a ground selection transistor GST. In FIG. 18, each of the NAND strings NS11 to NS33 is illustrated to include eight memory cells MC1 to MC8. However, example embodiments are not limited thereto. In some example embodiments, each of the NAND strings NS11 to NS33 may include any number of memory cells.

Each string selection transistor SST may be connected to a corresponding string selection line (one of SSL1 to SSL3). The plurality of memory cells MC1 to MC8 may be connected to corresponding gate lines GTL1 to GTL8, respectively. The gate lines GTL1 to GTL8 may be word lines and some of the gate lines GTL1 to GTL8 may be dummy word lines. Each ground selection transistor GST may be connected to a corresponding ground selection line (one of GSL1 to GSL3). Each string selection transistor SST may be connected to a corresponding bit line (e.g., one of BL1, BL2 and BL3), and each ground selection transistor GST may be connected to the common source line CSL.

Word lines (e.g., WL1) having the same height may be commonly connected, and the ground selection lines GSL1 to GSL3 and the string selection lines SSL1 to SSL3 may be separated. Even though not illustrated, the gate lines corresponding to the intermediate switching lines may be separated. In FIG. 18, the memory block BLKi is illustrated to be coupled to eight gate lines GTL1 to GTL8 and three bit lines BL1 to BL3. However, example embodiments are not limited thereto. Each memory block in the memory cell array 100 may be coupled to any number of word lines and any number of bit lines.

Figure 19:
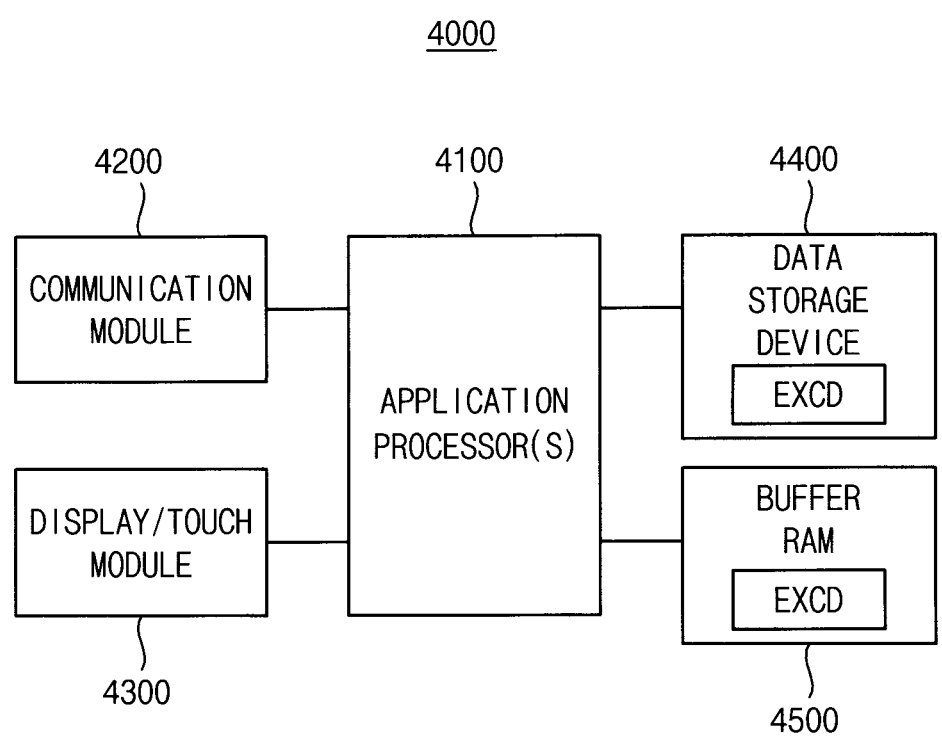
FIG. 19 illustrates a block diagram of a mobile device according to embodiments of the inventive concepts.

FIG. 19 illustrates a block diagram of a mobile device according to embodiments of the inventive concepts.

Referring to FIG. 19, a mobile device 4000 includes an application processor 4100 (including one or more application processors), a communication module 4200, a display/touch module 4300, a data storage device 4400, and a buffer RAM 4500.

The application processor 4100 controls operations of the mobile device 4000. The communication module 4200 is implemented to perform wireless or wire communications with an external device. The display/touch module 4300 is implemented to display data processed by the application processor 4100 and/or to receive data through a touch panel (not shown). The data storage device 4400 is implemented to store user data.

The data storage device 4400 may be an embedded multimedia card (eMMC), a solid state drive (SSD), a universal flash storage (UFS) device, or the like. The data storage device 4400 may upload the execution code EXCD to a host memory buffer HMB in the buffer RAM 4500 as described above.

The buffer RAM 4500 temporarily stores data used for processing operations of the mobile device 4000. For example, the buffer RAM 4500 may be double data rate (DDR) synchronous DRAM (SDRAM), low power DDR (LPDDR) SDRAM, graphics DDR (GDDR) SDRAM, Rambus DRAM (RDRAM®), or the like.

As described above, the data storage device and the method of operating the data storage device according to example embodiments may increase a speed of accessing the execution code and enhance performance of the data storage device even though the internal random accessible memory inside the data storage device may be deficient, using the host memory buffer as a storage of the execution code to control the operation of the data storage device. In addition, the data storage device and the method of operating the data storage device according to example embodiments may enhance security of the data storage device and the system including the data storage device by encoding the execution code and uploading the secured execution code to the host memory buffer.

The inventive concepts may be applied to a data storage device and any electronic devices including the data storage device. For example, the inventive concepts may be applied to systems such as be a memory card, a solid state drive (SSD), an embedded multimedia card (eMMC), a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those skilled in the art will readily appreciate that many modifications are possible in the example embodiments without materially departing from the inventive concepts.

What is claimed is:

1. A data storage device comprising:
   a nonvolatile memory device configured to store an execution code that controls operations of the data storage device;
   a storage controller configured to upload and store the execution code from the nonvolatile memory device to a host memory buffer included in an external host device during an initialization operation of the data storage device, and to download the execution code in realtime from the host memory buffer and execute the execution code downloaded from the host memory buffer during operation of the data storage device after the initialization operation is complete; and
   a mapping controller configured to manage a mapping table including mapping relations between the execution code and host addresses of the host memory buffer at which the execution code is stored.

2. The data storage device of claim 1, wherein the execution code comprises a plurality of code sections, and the mapping controller is configured to store in the mapping table the host addresses of uploaded code sections that are uploaded to the host memory buffer from among the plurality of code sections.

3. The data storage device of claim 2, wherein the storage controller is configured to upload all of the plurality of code sections to the host memory buffer during the initialization operation of the data storage device.

4. The data storage device of claim 2, wherein the storage controller is configured to upload a portion of the plurality of code sections to the host memory buffer during the initialization operation of the data storage device or during the operation after the initialization operation is complete.

5. The data storage device of claim 4, wherein the storage controller is configured to perform an updating operation to replace the uploaded portion of the plurality of code sections stored in the host memory buffer with other code sections from among the plurality of code sections.

6. The data storage device of claim 5, wherein the mapping controller is configured to store priority information in the mapping table, the priority information representing access importance or access frequency of the plurality of code sections.

7. The data storage device of claim 6, wherein the mapping controller is configured to provide, based on the priority information, an address of an uploaded code section having a lowest priority from among the uploaded portion of the plurality of code sections to the storage controller for the updating operation.

8. The data storage device of claim 2, further comprising an internal memory that is a random access memory,
   wherein the storage controller is configured to load and store a portion of the plurality of code sections from the nonvolatile memory device to the internal memory.

9. The data storage device of claim 8, wherein the mapping controller is configured to store in the mapping table internal addresses of the portion of the plurality of code sections stored in the internal memory.

10. The data storage device of claim 8, wherein at least a portion of the uploaded code sections stored in the host memory buffer overlaps with the portion of the plurality of code sections stored in the internal memory.

11. The data storage device of claim 2, further comprising:
    a security engine configured to encode the execution code to generate a secured execution code,
    wherein the storage controller is configured to upload the secured execution code to the host memory buffer.

12. The data storage device of claim 11, wherein the security engine is further configured to download in realtime the secured execution code from the host memory buffer, and decode the downloaded secured execution code to provide the execution code to the storage controller.

13. The data storage device of claim 11, wherein the security engine comprises:
    a key register configured to store a security key; and
    an encrypting and decrypting unit configured to encrypt the execution code based on the security key to provide the secured execution code, and configured to decrypt the secured execution code to provide the execution code.

14. The data storage device of claim 13, wherein the encrypting and decrypting unit is configured to generate an encrypted signature with respect to the execution code based on the security key, and combine the encrypted signature in the secured execution code.

15. The data storage device of claim 14, wherein the encrypting and decrypting unit is configured to decrypt the encrypted signature in the secured execution code to generate a decryption signature, and provide the execution code based on the decryption signature.

16. The data storage device of claim 11, wherein the security engine comprises:
    a seed generator configured to generate a seed value; and
    a randomizing and derandomizing unit configured to randomize the execution code based on the seed value to provide the secured execution code, and configured to derandomize the secured execution code to provide the execution code.

17. The data storage device of claim 1, wherein the storage controller is configured to store the mapping table in the nonvolatile memory device before the data storage device enters a power-down mode.

18. The data storage device of claim 17, wherein the storage controller is configured to load the mapping table stored in the nonvolatile memory device to the mapping controller and download the execution code stored in the host memory buffer based on the mapping table, when the data storage device is awakened from the power-down mode.

19. A data storage device comprising:
a nonvolatile memory device configured to store an execution code that controls operations of the data storage device;
a security engine configured to encode the execution code to generate a secured execution code;
a storage controller configured to upload and store the secured execution code to a host memory buffer included in an external host device, and to download the secured execution code in realtime from the host memory buffer to provide the downloaded secured execution code to the security engine; and
a mapping controller configured to manage a mapping table including mapping relations between the execution code and host addresses of the host memory buffer at which the secured execution code is stored,
wherein the security engine is further configured to decode the downloaded secured execution code to provide the execution code, and
the storage controller is further configured to execute the execution code provided from the security engine.

20. A method of operating a data storage device, comprising:
uploading and storing, by a storage controller included in the data storage device, an execution code that controls operations of the data storage device from a nonvolatile memory device included in the data storage device to a host memory buffer included in a host device, the uploading and storing during an initialization operation of the data storage device;
downloading, by the storage controller, the execution code in realtime from the host memory buffer and executing the execution code downloaded from the host memory buffer, the downloading during operation of the data storage device after the initialization operation is complete; and
managing, by a mapping controller included in the data storage device, a mapping table including mapping relations between the execution code and host addresses of the host memory buffer at which the execution code is stored.

* * * * *